United States Patent
Naiman et al.

(10) Patent No.: US 11,914,372 B2
(45) Date of Patent: Feb. 27, 2024

(54) ADVANCED FLIGHT PROCESSING SYSTEM AND/OR METHOD

(71) Applicant: Merlin Labs, Inc., Boston, MA (US)

(72) Inventors: Alexander Naiman, Boston, MA (US); Cynthia Comer, Boston, MA (US); Molly Connolly, Boston, MA (US)

(73) Assignee: Merlin Labs, Inc., Boston, MA (US)

( * ) Notice: Subject to any disclaimer, the term of this patent is extended or adjusted under 35 U.S.C. 154(b) by 0 days.

(21) Appl. No.: 17/891,845

(22) Filed: Aug. 19, 2022

(65) Prior Publication Data

US 2023/0057709 A1    Feb. 23, 2023

Related U.S. Application Data

(60) Provisional application No. 63/235,043, filed on Aug. 19, 2021.

(51) Int. Cl.
*G05D 1/00* (2006.01)
*G08G 5/00* (2006.01)
(Continued)

(52) U.S. Cl.
CPC .......... *G05D 1/0088* (2013.01); *G01S 13/933* (2020.01); *G01S 17/933* (2013.01);
(Continued)

(58) Field of Classification Search
CPC .... G05D 1/0088; G05D 1/101; G01S 13/933; G01S 17/933; G08G 5/0013;
(Continued)

(56) References Cited

U.S. PATENT DOCUMENTS

| 6,160,497 A | * | 12/2000 | Clark | G08G 5/0008 |
| | | | | 342/36 |
| 6,317,659 B1 | * | 11/2001 | Lindsley | G06Q 10/10 |
| | | | | 244/175 |

(Continued)

FOREIGN PATENT DOCUMENTS

| EP | 2665013 A1 | 11/2013 | |
| WO | WO-2014106273 A1 | * 7/2014 | .......... G08G 5/0013 |

OTHER PUBLICATIONS

Casado, Rafael , et al., "Neural Network-Based Aircraft Conflict Prediction in Final Approach Maneuvers", Electronics 2020, 9, 1708, www.mdpi.com/journal/electronics.

(Continued)

*Primary Examiner* — Bhavesh V Amin
(74) *Attorney, Agent, or Firm* — Jeffrey Schox; Diana Lin

(57) ABSTRACT

The method can include: determining sensor information with an aircraft sensor suite; based on the sensor information, determining a flight command using a set of models; validating the flight command S130; and facilitating execution of a validated flight command. The method can optionally include generating a trained model. However, the method S100 can additionally or alternatively include any other suitable elements. The method can function to facilitate aircraft control based on autonomously generated flight commands. The method can additionally or alternatively function to achieve human-in-the-loop autonomous aircraft control, and/or can function to generate a trained neural network based on validation of autonomously generated aircraft flight commands.

19 Claims, 9 Drawing Sheets

(51) Int. Cl.
*G10L 15/19* (2013.01)
*G10L 15/22* (2006.01)
*G05D 1/10* (2006.01)
*G01S 13/933* (2020.01)
*G01S 17/933* (2020.01)
*G10L 15/16* (2006.01)

(52) U.S. Cl.
CPC ........... *G05D 1/101* (2013.01); *G08G 5/0013* (2013.01); *G08G 5/0021* (2013.01); *G10L 15/16* (2013.01); *G10L 15/19* (2013.01); *G10L 15/22* (2013.01); *G10L 2015/223* (2013.01)

(58) Field of Classification Search
CPC .... G08G 5/0021; G08G 5/045; G08G 5/0052; G10L 15/16; G10L 15/19; G10L 15/22; G10L 2015/223; G10L 15/1822; G06F 3/167
See application file for complete search history.

(56) References Cited

U.S. PATENT DOCUMENTS

| | | | | |
|---|---|---|---|---|
| 6,405,132 B1* | 6/2002 | Breed | ............... | B60N 2/2863 701/45 |
| 6,542,796 B1* | 4/2003 | Gibbs | ............... | G08G 5/0021 701/14 |
| 6,552,669 B2* | 4/2003 | Simon | ............... | G08G 5/0091 340/961 |
| 6,700,482 B2* | 3/2004 | Ververs | ............... | G08G 5/0091 340/963 |
| 6,828,921 B2* | 12/2004 | Brown | ............... | G08G 5/0043 704/4 |
| 6,922,631 B1* | 7/2005 | Dwyer | ............... | G01C 23/00 701/467 |
| 6,926,233 B1* | 8/2005 | Corcoran, III | ......... | G05D 1/104 244/76 R |
| 6,965,816 B2* | 11/2005 | Walker | ............... | G08B 31/00 701/16 |
| 7,103,455 B2* | 9/2006 | Subelet | ............... | G01C 23/005 244/175 |
| 7,113,852 B2* | 9/2006 | Kapadia | ............... | G07C 5/085 701/32.8 |
| 7,177,731 B2* | 2/2007 | Sandell | ............... | G08G 5/0013 340/961 |
| 7,363,119 B2* | 4/2008 | Griffin, III | ........... | G08G 5/0039 244/175 |
| 7,415,326 B2* | 8/2008 | Komer | ............... | G08G 5/0013 701/3 |
| 7,650,232 B1* | 1/2010 | Paielli | ............... | G01C 23/005 340/978 |
| 7,876,238 B2* | 1/2011 | Vandenbergh | ....... | G01C 23/005 701/16 |
| 7,912,592 B2* | 3/2011 | Komer | ............... | G10L 15/26 701/3 |
| 8,019,489 B2* | 9/2011 | Harrison | ............... | G01C 23/005 455/431 |
| 8,149,141 B2* | 4/2012 | Coulmeau | ............ | G08G 5/0013 342/36 |
| 8,164,487 B1* | 4/2012 | Tsai | ................. | G08G 5/0039 455/412.2 |
| 8,285,427 B2* | 10/2012 | Rogers | ............... | G08G 5/0086 701/3 |
| 8,417,396 B2* | 4/2013 | Goodman | ............ | G08G 5/0013 701/3 |
| 8,423,272 B2* | 4/2013 | Judd | ................. | G08G 5/0013 701/410 |
| 8,639,401 B2* | 1/2014 | Bailey | ............... | G08G 5/0052 701/2 |
| 8,666,748 B2* | 3/2014 | Dong | ................. | B64D 45/00 704/270.1 |
| 8,892,349 B2* | 11/2014 | Estkowski | ............ | G08G 5/0026 701/16 |
| 9,171,472 B2* | 10/2015 | Scheu | ............... | G08G 5/0078 |
| 9,330,573 B2* | 5/2016 | Brandao | ............... | G08G 5/0021 |
| 9,443,433 B1* | 9/2016 | Conway | ............... | G08G 5/0026 |
| 9,592,921 B2* | 3/2017 | Paul Dominic | ....... | G08G 5/0013 |
| 9,598,180 B1* | 3/2017 | Browder | ............... | B64D 43/00 |
| 9,697,737 B2* | 7/2017 | Hale | ................. | G08G 5/0021 |
| 9,881,504 B2* | 1/2018 | Dominic | ............... | G08G 5/0052 |
| 10,935,938 B1 | 3/2021 | Bertram et al. | | |
| 2003/0093187 A1* | 5/2003 | Walker | ............... | B64D 45/0059 701/1 |
| 2003/0191568 A1* | 10/2003 | Breed | ............... | B60W 40/06 701/469 |
| 2003/0193408 A1* | 10/2003 | Brown | ............... | G08G 5/0043 340/945 |
| 2004/0122567 A1* | 6/2004 | Gaier | ............... | G01C 23/00 701/4 |
| 2005/0046584 A1* | 3/2005 | Breed | ............... | G06F 3/0237 340/13.31 |
| 2005/0049762 A1* | 3/2005 | Dwyer | ............... | G08G 5/0021 701/3 |
| 2005/0065682 A1* | 3/2005 | Kapadia | ............... | G07C 5/085 701/36 |
| 2005/0187677 A1* | 8/2005 | Walker | ............... | B64C 13/20 701/16 |
| 2005/0203675 A1* | 9/2005 | Griffin, III | ........... | G08G 5/0039 701/3 |
| 2005/0203676 A1* | 9/2005 | Sandell | ............... | G08G 5/0021 701/3 |
| 2006/0026017 A1* | 2/2006 | Walker | ............... | H04L 63/302 701/31.4 |
| 2007/0050101 A1* | 3/2007 | Sacle | ............... | B64D 45/0015 701/3 |
| 2007/0219678 A1* | 9/2007 | Coulmeau | ............ | G01C 23/005 701/3 |
| 2007/0288128 A1* | 12/2007 | Komer | ............... | G08G 5/0013 701/4 |
| 2007/0288129 A1* | 12/2007 | Komer | ............... | G10L 15/26 701/4 |
| 2008/0048908 A1* | 2/2008 | Sato | ............... | B60R 16/0373 340/901 |
| 2008/0114504 A1* | 5/2008 | Goodman | ............ | G08G 5/0013 701/3 |
| 2008/0154486 A1* | 6/2008 | Coulmeau | ............ | G08G 5/0034 701/120 |
| 2008/0167885 A1* | 7/2008 | Judd | ................. | G08G 5/0021 701/120 |
| 2008/0288169 A1* | 11/2008 | Meunier | ............ | G05D 1/106 701/301 |
| 2009/0130982 A1* | 5/2009 | Coulmeau | ............ | G08G 5/0013 455/63.3 |
| 2009/0326936 A1* | 12/2009 | Nagashima | ........... | G10L 15/32 704/235 |
| 2010/0030400 A1* | 2/2010 | Komer | ............... | G08G 5/0021 704/251 |
| 2010/0030401 A1* | 2/2010 | Rogers | ............... | G08G 5/0039 701/3 |
| 2010/0094532 A1* | 4/2010 | Vorona | ............... | G08G 1/09675 701/119 |
| 2010/0152924 A1* | 6/2010 | Pandit | ............... | G07C 5/0841 701/3 |
| 2010/0250025 A1* | 9/2010 | Vasek | ............... | G08G 5/0013 701/31.4 |
| 2010/0253595 A1* | 10/2010 | Szczerba | ............ | G02B 27/01 701/31.4 |
| 2010/0332054 A1* | 12/2010 | Brandao | ............... | G08G 5/0013 701/3 |
| 2012/0010763 A1* | 1/2012 | Goodman | ............ | G08G 5/0013 701/2 |
| 2012/0075124 A1* | 3/2012 | Whitlow | ............... | H04L 51/226 340/971 |
| 2012/0078447 A1* | 3/2012 | McGuffin | ............ | G08G 5/0021 701/3 |
| 2012/0078450 A1* | 3/2012 | Marche | ............... | G05D 1/0005 701/5 |
| 2012/0253649 A1* | 10/2012 | McGuffin | ............ | G08G 5/065 701/120 |

(56) References Cited

U.S. PATENT DOCUMENTS

| | | | | |
|---|---|---|---|---|
| 2013/0103297 | A1* | 4/2013 | Bilek | G08G 5/065 701/120 |
| 2013/0158991 | A1* | 6/2013 | Dong | G08G 5/0013 704/235 |
| 2014/0253585 | A1* | 9/2014 | Paul Dominic | G08G 5/0021 701/14 |
| 2014/0336915 | A1* | 11/2014 | Pakki | G08G 5/0013 701/120 |
| 2015/0251771 | A1* | 9/2015 | Whitlow | G08G 5/0021 701/3 |
| 2016/0019794 | A1* | 1/2016 | Dominic | G08G 5/0052 701/484 |
| 2016/0047674 | A1* | 2/2016 | Ramaiah | G08G 5/0021 340/995.27 |
| 2016/0155435 | A1* | 6/2016 | Mohideen | G10L 15/01 704/235 |
| 2016/0161283 | A1* | 6/2016 | Shamasundar | G08G 5/0013 701/3 |
| 2016/0373184 | A1* | 12/2016 | Oder | H04W 76/14 |
| 2017/0039858 | A1* | 2/2017 | Wang | G10L 15/08 |
| 2017/0076611 | A1* | 3/2017 | Shamasundar | G08G 5/0013 |
| 2017/0243496 | A1* | 8/2017 | McCann | G08G 5/0034 |
| 2017/0336803 | A1* | 11/2017 | Crozier | G05D 1/0607 |
| 2018/0061243 | A1* | 3/2018 | Shloosh | G08G 5/0043 |
| 2018/0261104 | A1* | 9/2018 | Jonak | G08G 5/0021 |
| 2018/0364707 | A1 | 12/2018 | Bosworth et al. | |
| 2020/0335084 | A1 | 10/2020 | Wang et al. | |
| 2021/0026354 | A1 | 1/2021 | Alves et al. | |
| 2023/0057709 | A1 | 2/2023 | Naiman et al. | |

OTHER PUBLICATIONS

Lum, Christopher W., et al., "Human-in-the-Loop Distributed Simulation and Validation of Strategic Autonomous Algorithms", 26th AIAAA Aerodynamic Measurement Technology and Ground Testing Conference Jun. 23-26, 2008, Seattle, Washington.

Muliadi, Jemie, et al., "Neural Network Control System of UAV Altitude Dynamics and Its Comparison with the PID Control System", Hindawi, Journal of Advanced Transportation, vol. 2018, Article ID 3823201, 18 pages.

\* cited by examiner

ADVANCED FLIGHT PROCESSING SYSTEM AND/OR METHOD

CROSS REFERENCE TO RELATED APPLICATIONS

This application claims the benefit of U.S. Provisional Application No. 63/235,043, filed 19 Aug. 2021, which is incorporated herein in its entirety by this reference.

TECHNICAL FIELD

This invention relates generally to the aviation field, and more specifically to a new and useful flight processing system and/or method in the aviation field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
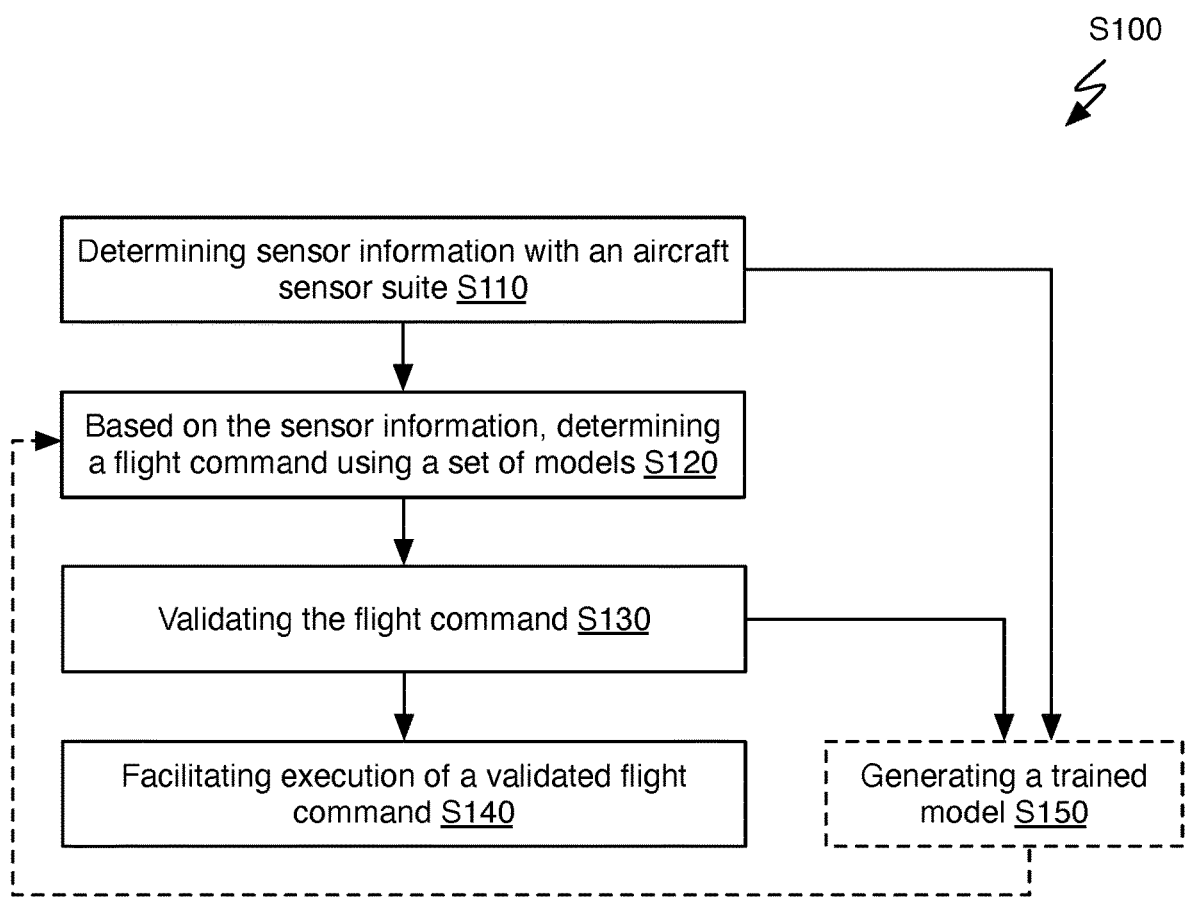
FIG. 1 is a flow chart diagrammatic representation of a variant of the method.

The method S100, an example of which is shown in FIG. 1, can include: determining sensor information with an aircraft sensor suite S110; based on the sensor information, determining a flight command using a set of models S120; validating the flight command S130; and facilitating execution of a validated flight command S140. The method can optionally include generating a trained model S150. However, the method S100 can additionally or alternatively include any other suitable elements. The method preferably functions to facilitate aircraft control based on autonomously generated flight commands (e.g., in a certifiable, fault-tolerant, and/or failure resilient manner). The method can additionally or alternatively function to achieve human-in-the-loop autonomous aircraft control, and/or can function to generate a trained neural network based on validation of autonomously generated aircraft flight commands.

Figure 2:
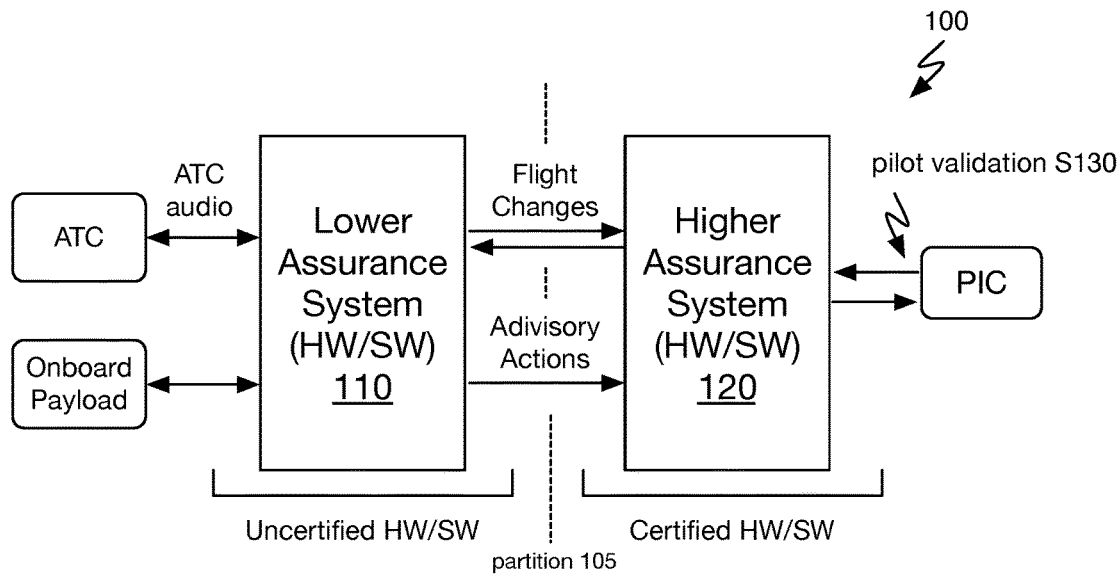
FIG. 2 is a schematic representation of a variant of the system.

The system 100, an example of which is shown in FIG. 2, can include: a lower assurance system 110 and a higher assurance system 120. However, the system 100 can additionally or alternatively include any other suitable set of components.

In an illustrative example, the method S100 can include: receiving an ATC audio stream, converting the ATC audio stream to ATC text, and providing the ATC text and a predetermined set of queries to an ATC-tuned question and answer model which analyzes an ATC text for the query answers. The query answers can then be used to select follow-up queries and/or fill out a command parameter value. The ATC audio stream can be converted to the ATC text using an ATC-tuned integrated sentence boundary detection and automatic speech recognition model and an ATC-tuned language model, wherein an utterance hypothesis can be selected for inclusion in the ATC text based on the joint score from the SBD/ASR model and a language model. The command parameter values can be transformed into a (verified) human readable format using a command Application Protocol Interface (API) (e.g., within a certified processing system; within a failure resilient processing system; deterministically; with triply redundant processing; etc.) and relayed to a pilot-in-command (PIC), such as pilot onboard the aircraft and/or a remote operator (e.g., via satellite, RF, cellular, and/or other remote communications). The PIC can then validate and/or revise commands via a pilot interface (e.g., certified; resilient to failure conditions; within the higher assurance system; etc.), and the validated commands can be used to control the aircraft via a certified/certifiable flight management system (FMS) and/or a certified/certifiable flight control system (FCS).

In a second illustrative example, the method S100 can include determining imaging data and/or aircraft state data via an aircraft sensor suite. Imaging data and aircraft state data can be used by AI/ML based engines (e.g., uncertified or specially certified, relying on multi-core processing, within the lower assurance system, etc.) which can perform detection, classification, tracking of collision threats, and generation of resolution advisories (e.g., advisory actions in the form of command parameter values). The command parameter values can be transformed into a (verified) human readable format using a command API (e.g., within a certified processing system; within the higher assurance system; deterministically; with triply redundant processing; etc.) and relayed to a pilot-in-command (PIC), such as pilot onboard the aircraft or a remote operator (e.g., via satellite/RF remote communications). The pilot can then validate and/or revise commands via a pilot interface (e.g., certified; resilient to failure conditions; within the higher assurance system; etc.), and the validated commands can be used to control the aircraft via a certified/certifiable flight management system (FMS) and a certified/certifiable flight control system (FCS).

The system can operate on any suitable vehicle. The vehicle is preferably an aircraft such as: a fixed-wing aircraft, rotorcraft, tilt-rotor aircraft, tilt-prop aircraft, tilt-wing aircraft, helicopter, or jetcraft, but can additionally or alternately be a spacecraft (e.g., rocket, satellite), watercraft (e.g., boat, submarine, hovercraft), land vehicle (e.g., train, car, bus, tank, truck, etc.), and/or any other suitable vehicle. It is understood that all references to "aircraft" or aviation herein can be equally applicable to any other suitable vehicles or transportation modalities.

The system 100 and/or portions thereof—such as the higher assurance system 120—can be certified and/or integrated into a certified aircraft. Additionally or alternatively, one or more portions of the system—such as the lower assurance system 110—may be uncertified (or specially certified), isolated from the remainder of the aircraft (e.g., via a physical partition, virtual partition, software partition, and/or any other suitable partition), certified as a flight aid or flight assistive device, and/or can be otherwise implemented.

In a first example, the higher assurance system is partitioned from the lower assurance system in compliance with ARINC 653 standards—a software specification for space and time partitioning in safety critical avionics real-time operating systems (RTOS)—and/or using an ARINC 653 platform. In a second example, the higher assurance system is physically partitioned from the lower assurance system via physical hardware separation (e.g., physically separate hardware systems; hardware systems in separate physical enclosures; hardware systems separated by a firewall; etc.).

In some variants, the design assurance level (DAL) of the higher assurance system 120 is greater than the design assurance level of the lower assurance system 110. In an example, the higher assurance system can be a high DAL system which is DO-178 compliant, tested, and/or certified (e.g., while the lower assurance system can be a low DAL system, uncertified, specially certified, and/or not governed by the same regulatory guidelines). Alternatively, the assurance and/or resilience of the higher assurance system 120 can be greater than that of the lower assurance system as a result of: failure resilience (and/or fault tolerance), compute structure (e.g., the higher assurance system can be single core whereas the lower assurance system can be multi-core), testability, auditability, input constraints (e.g., inputs to the higher assurance system can be subject to greater verification and/or validation, inputs to the lower assurance system may be substantially infinitely variable, etc.), model-based computing structures, certification level (e.g., under any suitable regulatory guidelines), relative criticality (e.g., FMEA considerations), security (e.g., encryption standards, program edit or update accessibility, etc.), and/or the assurance of the higher assurance system can otherwise exceed the assurance of the lower assurance computing system (e.g., by any combination of the aforementioned assurance considerations). However, the assurance of the higher assurance system 120 can otherwise be greater relative to the lower assurance system no.

In a first example, the higher assurance system can be designed to address critical failure conditions (e.g., in support of Type Certification). In a second example, the lower assurance system can be a flight-aid.

2. BENEFITS

Variations of the technology can afford several benefits and/or advantages.

First, variations of this technology can enable certifiable control of an aircraft using an autonomous agent. Autonomous agents can utilize uncertifiable (or not directly certifiable) hardware and/or software components, such as multi-core processors, a set(s) of advanced models (e.g., neural networks, machine learning [ML] models, etc.), and/or other forms of advanced processing, which are separated/partitioned from primary aircraft hardware/software (e.g., physically separated by a hardware partition, partitioned via a software firewall, etc.; via partition 105). In such variants, autonomous agents can be configured to transform a set of arbitrary (or unstructured) sensor inputs into a finite set of commands, which can be validated and/or executed in a deterministic "human-in-the-loop" control scheme. For example, incoming audio data signals, such as from an ATC radio stream, and/or perception data (e.g., Radar returns, camera images, LIDAR point clouds, etc.) may be substantially unconstrained (e.g., unstructured), infinitely variable, and/or uncontrolled; and it may be exceedingly difficult or impossible to deterministically demonstrate how advanced processing systems may respond to for all of sensor inputs (e.g., in order to certify the complete system).

Second, variants can reduce the cognitive load on pilots in safety-critical and/or stressful situations, since they can provide persistent augmentation and/or command generation during some or all periods of aircraft operation. As an example, a pilot may be relied upon to validate responses to air traffic control (ATC) audio rather than directly interfacing with ATC. As a second example, a pilot may only be relied upon to confirm resolution advisory actions (to obstacles/hazards) rather than directly generating/controlling a response. As a third example, an aircraft may fully automate aircraft landing as directed by visual flight rules (e.g., with minimal to no pilot intervention). However, variants can otherwise reduce cognitive load for pilots and/or otherwise suitably automate/augment aircraft control.

Third, variants can enable remote validation of (autonomously generated) aircrafts commands/operations, which can reduce the number of pilots onboard an aircraft. As an example, a system 100 can act in place of a co-pilot (e.g., where a primary pilot validates commands of the co-pilot and/or can be used to train the system). In a second example, a system 100 can enable remote operation of a commercial aircraft (e.g., with no human pilot and/or no human passengers).

However, variations of the technology can additionally or alternately provide any other suitable benefits and/or advantages.

3. SYSTEM

The system 100, an example of which is shown in FIG. 2, can include: a lower assurance system 110 and a higher assurance system 120. However, the system 100 can additionally or alternatively include any other suitable set of components.

Figure 3:
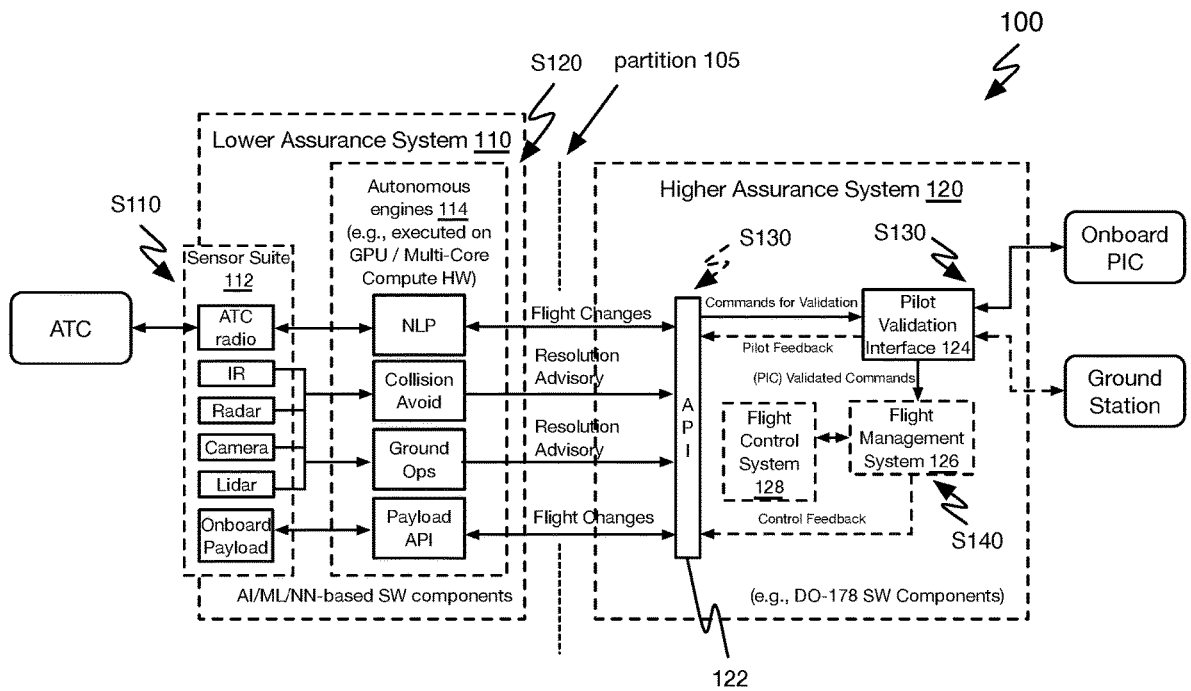
FIG. 3 is a schematic diagram of a variant of the system and/or method.

The lower assurance system (e.g., an example is shown in FIG. 3) can include an aircraft sensor suite 112 and one or more autonomous engines 114. The lower assurance system functions to generate commands, such as a flight change or a resolution advisory, to be used for aircraft control. The lower assurance system is preferably uncertified, specially certified, or certified as a flight aid, but can alternatively be designed to meet any suitable certification standards (e.g., a low design assurance level [DAL] standard). The lower assurance system can include redundant (e.g., triply redundant) power and/or data connections between sources and/or sinks. Lower assurance system components (e.g., compute hardware/processors) can be enclosed within enclosures with any suitable protections such as: electrical grounding and/or EMI shielding, a physical firewall, ingress protections (e.g., IP67 enclosure), and/or any other suitable protections.

The lower assurance system can optionally include or can be used with an aircraft sensor suite 112 which functions to monitor the operation of the system and/or receive sensory inputs (e.g., ATC audio). The sensor suite can include: communication sensors (e.g., radiofrequency receiver, radiofrequency transmitter; ATC communication); imaging sensors, such as IR sensors, time-of-flight sensors (e.g., radar, lidar), optical sensors (e.g., RGB camera); and aircraft sensors such as: inertial sensors (e.g., accelerometers, gyroscopes, IMUs, magnetometers, etc.), GPS/GNSS, air data sensors, effector sensors (e.g., impedance sensors, hall-effect sensors, optical sensors, audio sensors, position/displacement sensors, force sensors, pressure sensors, encoders, resolvers, proximity sensors, string potentiometers, ultrasonic sensors, and/or any other suitable devices which can be configured to monitor/measure effector states); payload sensors; and/or any other suitable sensors.

In a specific example, the sensor suite can include: three 120° flight radar modules (e.g., collectively offer 360° surround vision with utility for all active flight modes to 2 km range); 4 cameras with two forward-facing cameras: (1) a hi-res 4K forward-facing camera of 60° azimuth×40° elevation (e.g., 5 km range; a tail-mounted forward-facing camera can be configured to detect beyond the wingtips to enable greater visibility ground operations), and (2) a 120°× 80° medium-resolution camera (1 km range) plus two 120°× 80° cameras face up and down to detect above and below; lidar 360° H×30° V coverage to 120 m (e.g., which may enable ground operations).

In a second example, the sensor suite can include a radio communication system (e.g., ATC radio), substantially as described in U.S. application Ser. No. 17/500,358, filed 13 Oct. 2021, which is incorporated herein in its entirety by this reference.

In a third example, the sensor suite can include the sensors and/or perception systems substantially as described in U.S. application Ser. No. 17/674,518, filed 17 Feb. 2022, which is incorporated herein in its entirety by this reference.

In a fourth example, the sensor suite can include an onboard payload.

In some variants, the aircraft sensor suite can be part of the lower assurance system (and/or can include uncertified HW components/sensors or specially certified HW components/sensors) and/or can be certified as part of the aircraft (e.g., an ATC radio integrated with the aircraft).

However, the aircraft sensor suite can include any other suitable sensors.

The lower assurance system can include autonomous engines 114, which function to transform sensor information (e.g., from the sensor suite) into commands for the higher assurance system. Autonomous processing engines can include: a natural language processing (NLP) engine (e.g., tuned for ATC utterances), a collision avoidance engine (e.g., "detect and avoid" agent based on imaging data), a ground operations engine (e.g., operating under VFR based on the imaging data), an emergency management engine, an anomaly detection engine, contingency planning/navigation engine, and/or any other suitable autonomous engines/functionalities. The lower assurance system can additionally or alternatively include a payload API, which functions to determine flight commands based on an uncertified payload (e.g., high-resolution camera payload executing a particular mission). Autonomous processing engines can include uncertified hardware and/or software components, such as: GPUs and/or uncertified multi-core compute hardware, neural networks (e.g., which may be trained and/or updated based on command validation), and/or any other suitable elements. The lower assurance system processing can be centralized or distributed. The lower assurance system processing is preferably performed locally (e.g., onboard the aircraft), but can additionally or alternatively include any suitable remote (e.g., cloud) processing and/or other suitable processing elements.

In a specific example, the lower assurance system can include a natural language processing (NLP) system for semantic parsing of air traffic control (ATC) audio as described in U.S. application Ser. No. 17/500,358, filed 13 Oct. 2021, which is incorporated herein in its entirety by this reference (and/or can be configured to execute any combination/permutation of the method elements described therein).

In a second example, the lower assurance system can include autonomous navigation and/or landing systems (a.k.a., ground operations system) as described in Ser. No. 17/674,518, filed 17 Feb. 2022, which is incorporated herein in its entirety by this reference (and/or can be configured to execute any combination/permutation of the method elements described therein).

In a third example, the lower assurance system can include a payload API configured to determine flight commands and/or flight changes (e.g., using uncertified or specially certified processing).

In a fourth example, the lower assurance systems can include an autonomous collision avoidance system.

In a first set of variants, lower assurance systems are performed using a separate processor(s) from the higher assurance system(s). As an example, the higher assurance and lower assurance systems can be separated by a partition 105, such as a hardware-software (HW-SW) partition. Alternatively, lower assurance systems can be executed using partitioned compute of a higher assurance processing system (e.g., a single processor can include portions of both the higher assurance and lower assurance systems, wherein a software partition exists between the higher assurance system and lower assurance system). The software partition can be a logical partition, memory partition, disk partition, different computing space instances (e.g., different containers, virtual machines, etc.), firewall, and/or any other suitable software-implemented partition. However, the lower assurance system(s) can be otherwise separated from the higher assurance system(s) and/or the system can include or be used with any other suitable partition(s).

In variants, the lower assurance systems can include object detection and/or classification modules (e.g., as part of a detect and avoid system). In some variants, the flight commands can include resolution advisories based on the object detection/classification. Additionally or alternatively, flight commands (and/or communications to the higher assurance system(s), can optionally include envelope protections/restrictions based on the object detection/classification or otherwise include detected/classified objects within the environment (e.g., an environmental representation including other aircraft and/or terrestrial obstacles), wherein the higher assurance system may be responsible for object avoidance and/or path planning based on the detected/ classified objects.

However, the lower assurance system can include any other suitable elements.

The higher assurance system 120 can include a command API 122 and a pilot validation interface 124. The higher assurance system can optionally include (and/or can be used with) a flight management system (FMS) 126 and a flight control system (FCS) 128. However, the higher assurance system can include any other suitable components. The higher assurance system is preferably certifiable and deterministically testable. For example, the higher assurance system can be certified to a high Design Assurance Level (DAL) standard (e.g., Do-178 software components). However, the higher assurance system can be otherwise certified/ certifiable under any other suitable regulatory guidelines/ procedures.

The command API functions to validate command compliance (e.g., prior to providing them to downstream systems, such as the pilot validation interface 124). Additionally or alternatively, the command API can function to provide commands to the pilot validation interface (e.g., in response to validating format compliance; in a human-interpretable and/or human readable format; in a machine readable format; etc.). The command API is preferably run on the higher assurance system, but can additionally or alternatively be run on the lower assurance system (e.g., wherein semantic commands can be sent to the higher assurance system) and/or on any other suitable system. In a first example, the API can confirm that the format of a command matches a predetermined formatting convention, such as by performing a checksum or other protocol (e.g., hash function; cryptographic hash function; etc.), thus converting the command into 'verified human readable command' which can be provided to the PIC via the pilot validation interface. In a second example, the API can transcribe a plurality of non-null command parameter values into a human readable format. In a third example, the API can validate the command value (e.g., "1" is a valid command). However, the higher assurance system can include any other suitable command API.

The API can optionally transform the command(s) into a human readable (e.g., human-interpretable, semantic) format. Alternatively, commands can be transformed into a human readable format at the pilot validation interface, be received at the command API in a human readable format (e.g., from the lower assurance system), and/or can otherwise be converted between formats or otherwise deterministically handled by the command API.

The pilot validation interface 124 functions to provide human readable commands (for human validation) from the command API to the PIC and receive confirmation (e.g., accepting the flight command) or rejection. The pilot validation interface passes PIC validated commands to the FMS to facilitate execution according to S140. The pilot validation interface can additionally or alternatively provide validation feedback to the lower assurance system via the (e.g., which may serve as a state input for various autonomous agents; which may be used to update models according to S150). In a first variant, the pilot validation interface can receive inputs in the form of a binary (confirmation/rejection) input. In a second variant, the pilot validation interface can receive text strings and/or audio signals (e.g., command modifications, etc.) from a PIC. However, the PIC can otherwise validate commands and/or can include any other suitable pilot validation interface.

The optional FMS 126 and/or FCS 128 can function to facilitate execution of PIC-validated commands from the pilot validation interface according to S140. In variants, the FMS and/or FCS can be integrated within an existing certified aircraft (e.g., where the system 100 is implemented as an aircraft retrofit). Alternatively, the FMS and/or FCS can be integrated into the system 100 as a certified retrofit package. However, the system can otherwise facilitate execution of PIC validated commands from the pilot validation interface.

In variants, the higher assurance system 120 includes only certified components and/or processing elements. The higher assurance system preferably includes: single core processors executing deterministic and repeatably testable operations; triply redundant power and/or data connections; and/or can be configured according to any other suitable set of certification requirements. In a specific example, the higher assurance system can be partitioned from the lower assurance system (e.g., in accordance with ARINC 653 standards; via partition 105; etc.).

In variants, operational checklist(s), validation/verification protocols, and/or other processes can be encoded within the higher assurance systems. For example, takeoff procedures and/or flight command validation (e.g., at the API) can be encoded within the higher assurance system and/or higher assurance processes.

However, the system can include any other suitable higher assurance system(s).

In some variants, multiple (redundant) lower assurance modules can exist, which handle the same or similar autonomous function(s). For example, multiple distinct/redundant autonomous engines can generate flight commands (e.g., synchronously, asynchronously, contemporaneously, etc.) to accommodate the same external factors and/or emergent scenarios. In such circumstances, the higher assurance system can handle voting and/or robust fusion (e.g., between contemporaneous commands, between commands received by parallel communication pathways, etc.) of multiple commands received from distinct autonomous engines of the set. As an example, the lower assurance system can include two different ATC NLP modules: such as a model-based natural language processor and a syntax-based natural language processor, where the higher assurance system can handle voting/fusion between the disparate NLP modules. Additionally, the system can include any suitable communication and/or processing redundancies between the lower assurance and higher assurance systems. In variants, the system can include triple redundancy (e.g., triple-triple redundancy) of communication and/or processing between the lower assurance and higher assurance systems. As an example, autonomous engines can be triply redundant (e.g., multiple lower assurance computing systems performing the same operations/functionalities), with command voting/fusion performed at the higher assurance system. As a second example, communication channels can be triply redundant between the lower assurance and higher assurance systems (e.g., three distinct communication pathways), with signal voting performed at the higher assurance system.

However, the system and/or method can include any other suitable communication and/or processing redundancies, which can be distributed between the lower assurance system and higher assurance system in any suitable manner.

However, the system can include any other suitable components.

4. METHOD

The method S100, an example of which is shown in FIG. 1, can include: determining sensor information with an aircraft sensor suite S110; based on the sensor information, determining a flight command using a set of models S120; validating the flight command S130; and facilitating execution of a validated flight command S140. The method can optionally include generating a trained set of models S150. However, the method S100 can additionally or alternatively include any other suitable elements. The method preferably functions to facilitate aircraft control based on autonomously generated flight commands (e.g., in a certifiable and/or higher assurance manner). The method can additionally or alternatively function to achieve human-in-the-loop autonomous aircraft control, and/or can function to generate a trained neural network based on validation of autonomously generated aircraft flight commands.

The method and/or sub-elements thereof can be performed: once, repeatedly, continuously, periodically, aperiodically, in response to satisfaction of an event trigger (e.g., pilot input, remote request, satisfaction of a navigational condition, initiation of an aircraft mission, etc.), and/or with any other suitable frequency/timing. Method elements can be performed synchronously, contemporaneously (e.g., with a common time interval, with different intervals), asynchronously, sequentially/serially, iteratively, in response to an event trigger, and/or with any other suitable timing/relationship.

Determining sensor information with an aircraft sensor suite Silo functions to provide inputs which can be used to determine flight commands (e.g., with autonomous agents and/or via advanced processing techniques). Sensor information can include: audio data (e.g., received at a communication system such as an ATC radio), imaging data (e.g., from IR cameras, RGB cameras, radars, lidars, etc.), aircraft state data, payload data (e.g., as may be generated by an on-board payload and parsed via a payload-specific API) and/or any other suitable information. Sensor information can be determined continuously, periodically (e.g., with a specified data rate), synchronously or asynchronously across multiple sensor classes (of various sensors of the sensors suite), in response to an event trigger (e.g., receipt of an ATC utterance), and/or with any other suitable timing/frequency. Sensor information can include: raw sensor data, pre-processed data (e.g., raw time-of-flight data, time-of-flight detections, etc.), filtered data, unfiltered data, and/or any other suitable sensor information.

Sensor information can be unstructured and/or substantially infinitely variable. In variants, wherein the lower assurance system receives the sensor data comprising unstructured information, the lower assurance system can include a set of pre-trained neural networks configured to autonomously determine a flight command in a predetermined, machine-readable format from the unstructured information. As an example, sensor information can include an ATC audio or text string without a predetermined syntactical structure.

However, sensor information can be otherwise suitably determined.

Figure 7:
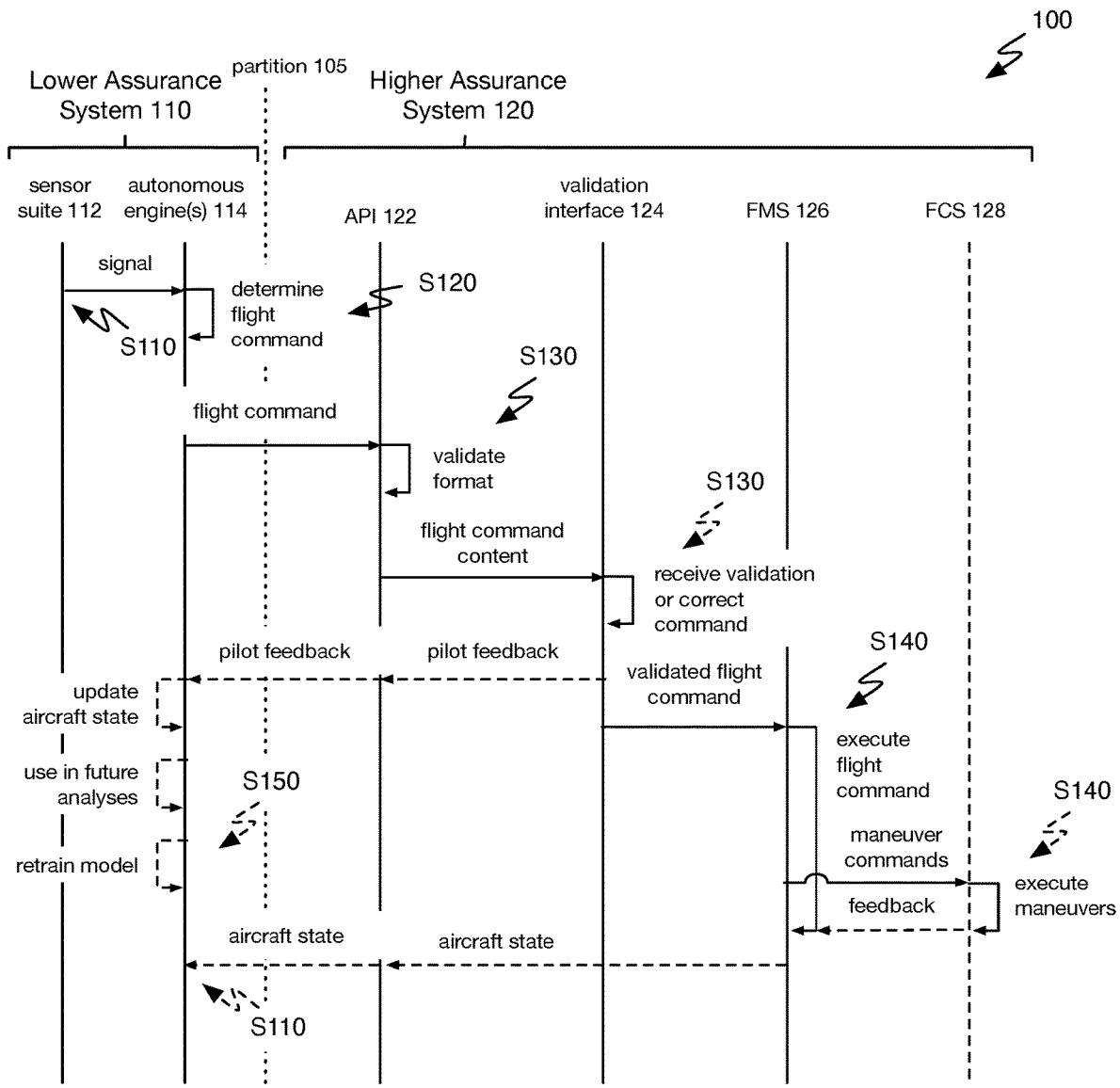
FIG. 7 is a schematic representation of an example of aircraft control using an example of the system.

Based on the sensor information, determining a flight command using a set of models S120 functions to determine flight commands from the sensor information, which can be used to facilitate aircraft control according to S140. S120 is preferably performed at the lower assurance system, the flight commands are and subsequently validated (and/or executed) by the higher assurance system (e.g., an example is shown in FIG. 7).

Flight commands can be semantic commands, such as high-level guidance commands or flight changes (e.g., "increase speed by ten knots", "turn left heading to zero nine zero degrees", etc.), resolution advisories (e.g., navigation and/or guidance instructions to avoid an imminent collision), flight guidance parameters (e.g., altitude: 2000), absolute commands (e.g., "set altitude to two thousand"), relative commands (e.g., "descend by one thousand feet", "reduce airspeed by ten knots"), and/or any other suitable commands.

Each flight command preferably includes a data format and a set of values. The flight commands preferably adhere to a strict, predetermined format, but can alternatively have any data format. Different flight commands can have the same or different format, which can be specified in support of certification or otherwise handled. Flight commands are can be human readable (or an equivalent thereof, such as a computer readable ASCII string which may be considered interchangeable with a corresponding to a human readable semantic string), computer readable format (e.g., JSON), and/or processed in any other suitable data format (e.g., flightpath trajectory, waypoint coordinates, etc.).

The flight command values (e.g., flight command content) are preferably selected from a predetermined set of values, but can alternatively be dynamically determined or otherwise limited or unlimited. In variants, the set of values and/or range(s) of values can be specified (e.g., in support of certification and/or fixed as a part of certification) and/or predetermined, or can be otherwise handled. Examples of values can include the permitted parameter values for a given command type, such as flight changes or resolution advisories. The permitted parameter values can be specified by: a regulatory body, by the aircraft (e.g., by the physical limitations of the aircraft, by the flight actuator resolution, etc.), manually determined, and/or otherwise specified. In a first variation, the flight command includes a template including a series of one or more parameters, wherein the parameter values can be determined by the set of models. For example, a flight change template can include "ADJUSTMENT speed VALUE knots," where "ADJUSTMENT" can be selected from a set including "increase," "maintain," and "decrease," and "VALUE" can be selected from a set including 0-200. In a second variation, the set of values includes every achievable combination of possible parameter values, wherein the model selects a combination as the flight command. For example, the set of values includes every permutation of "ADJUSTMENT speed VALUE knots," where "ADJUSTMENT" is selected from a set including "increase" and "decrease," and "VALUE" is selected from a set including 0-200. However, the flight command values can be otherwise configured.

Figure 4:
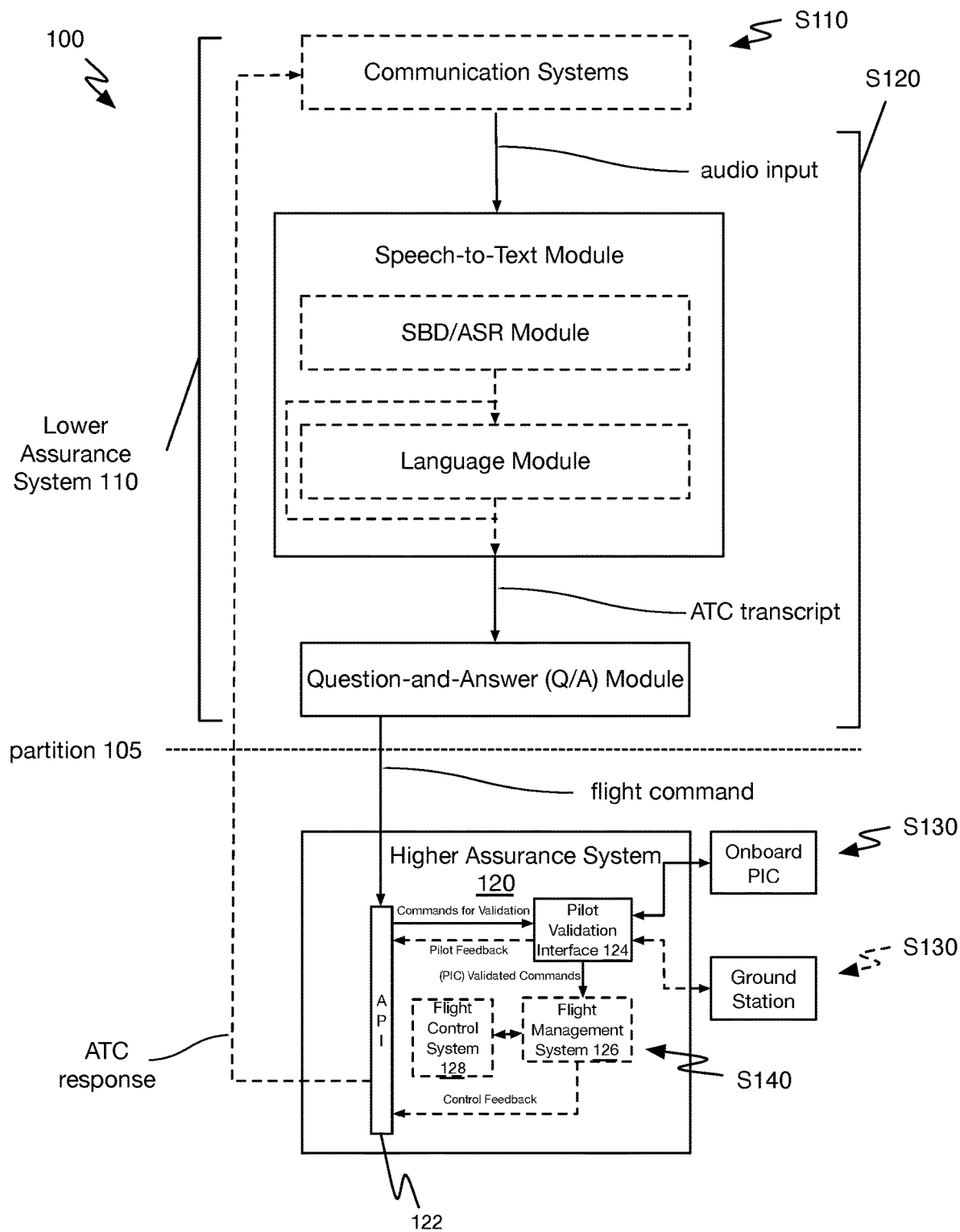
FIG. 4 is an example representation of a variant of the system and/or method.
Figure 5:
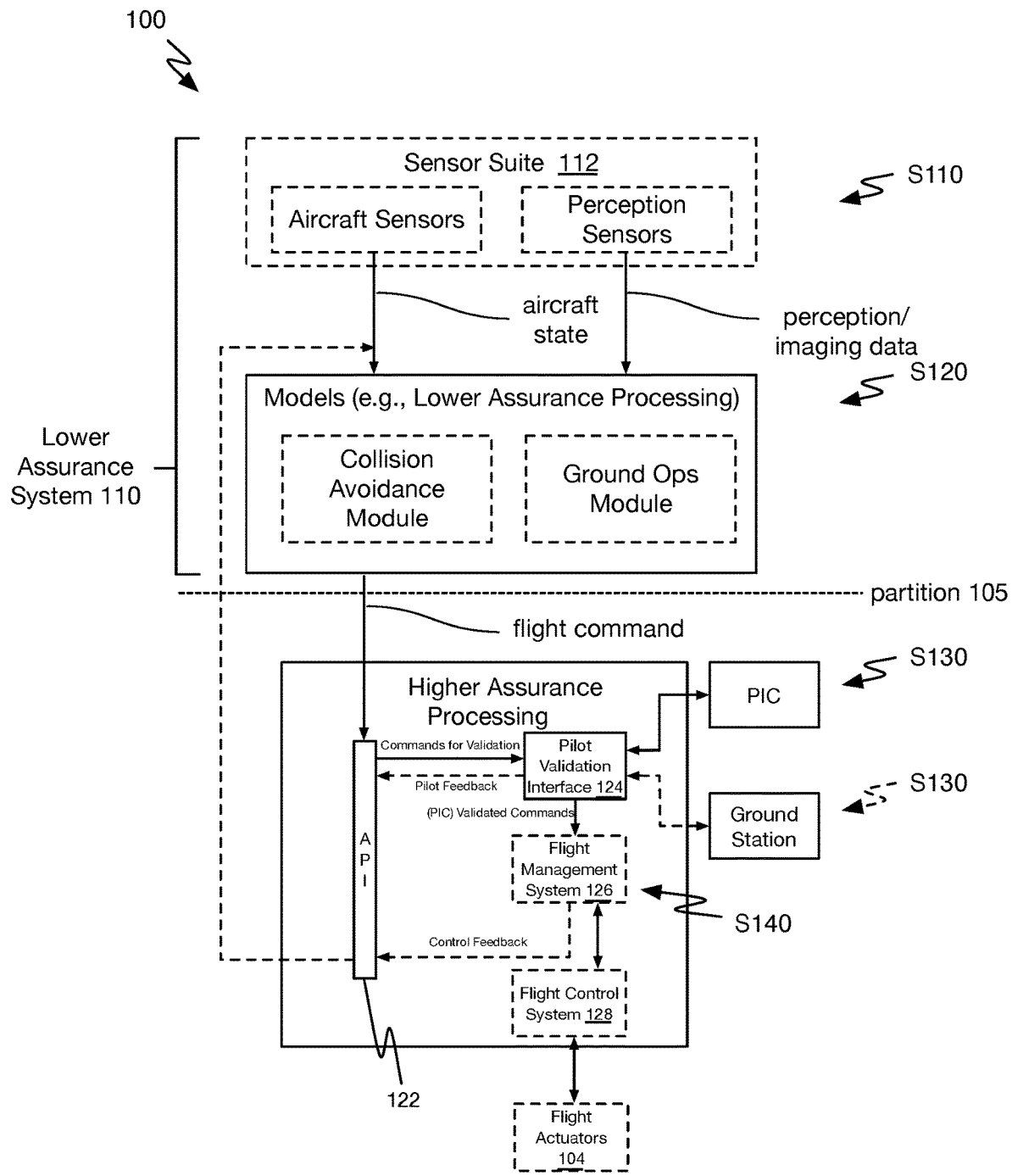
FIG. 5 is an example representation of a variant of the system and/or method.

The set of models used to generate flight commands (an example is shown in FIG. 5) can include: NLP engines (e.g., tuned for ATC utterances; which can include: multiple-query Question/Answer models, ASR models, SBD models, language models, and/or any other suitable neural models; an example is shown in FIG. 4), collision avoidance engines (e.g., "see and avoid" engines, which can include: object detectors, object classifiers, object trackers, object avoidance models, etc.), ground operations engines (e.g., which can include feature detectors and/or landing site identifiers, etc.), and/or any other suitable models. The set of models can include: a neural network (e.g., deep neural networks; CNN, RNN, FCN, ANN), a cascade of neural networks, Bayesian networks, Markov chains, pre-determined rules, probability distributions, heuristics, probabilistic graphical models, classifiers (e.g., binary classifiers, multiclass classifiers), or other models.

In operation, S120 can include: analyzing the sensor information using one or more models. When the model(s) generates multiple candidate outputs, such as when a multiclass classifier is used, S120 can optionally include selecting an output value (e.g., flight command value) from the set of candidate outputs. The output value can be selected using: a decision tree, the confidence score associated with the candidate output, the precision or accuracy of the candidate output (e.g., determined from the covariance or variance), and/or otherwise selected. S120 preferably outputs single flight command for a given command type (e.g., flight change, resolution advisory, etc.) from the lower assurance system for any point in time, but can alternatively output a single flight command for each model at any point in time, concurrently output multiple flight commands of a given command type from the lower assurance system, concurrently output multiple flight commands from each model, and/or output any other suitable number of flight commands with any other suitable timing.

In a first variant, S120 can include, using an NLP engine: receiving an ATC audio stream, converting the ATC audio stream to ATC text, and providing the ATC text and a predetermined set of queries to an ATC-tuned question and answer model which analyzes an ATC text for the query answers. The query answers can then be used to select follow-up queries and/or fill out a command parameter value. The ATC audio stream can be converted to the ATC text using an ATC-tuned integrated sentence boundary detection and automatic speech recognition model and an ATC-tuned language model, wherein an utterance hypotheses can be selected for inclusion in the ATC text based on the joint score from the SBD/ASR model and a language model. The command parameter values can be provided (e.g., in a human readable format) to the command Application Protocol Interface (API) to be validated in S130.

In a second variant, S120 can include, using a collision avoidance engine: detecting, classifying, and tracking a collision threat (e.g., a non-transponder aircraft on a collision course) and generating a recommended course of action in the form of a resolution advisory (e.g., in a semantic form; as a flightpath trajectory or waypoints, etc.) to allow own aircraft to avoid the collision without cooperation from the intruder. The resolution advisory can be provided (e.g., in a human readable format) to the command Application Protocol Interface (API) to be validated in S130.

In a third variant, S120 can include, using a ground operations engine: extracting features from the sensor information (e.g., lidar and/or optical imaging data); identifying a landing site based on the extracted features; optionally localizing the aircraft based on the extracted features; and determining a flight command (e.g., flight changes such as course corrections; which may be based on the aircraft location relative to the extracted features) to facilitate navigation to the identified landing site. The flight command can be provided (e.g., in a human readable format) to the command Application Protocol Interface (API) to be validated in S130.

S120 and/or elements thereof can be performed continuously, repeatedly, iteratively, in response to receipt of (updated) sensor data, in response to satisfaction of an event trigger (e.g., ATC request, collision threat determination, satisfaction of approach/landing threshold, etc.), and/or with any other suitable timing/frequency.

S120 can additionally or alternatively be performed without adjustments to the flight path and/or updated flight command generation during one or more periods of operation (e.g., where the aircraft may continue to execute a prior flight command, prior mission plan, and/or set of prior navigation instructions). As an example, no new flight commands (e.g., a null flight command) may be determined for an ATC radio utterance (e.g., and/or no flight commands may not be provided to the higher assurance system for validation in Block S130) in response to a determination that the aircraft is not the intended recipient of the ATC radio utterance.

In a first example, S120 can include: with a speech-to-text module of the lower assurance system (e.g., an autonomous computing system), determining an utterance hypothesis from an ATC audio signal using a first pre-trained neural network model; and with a question-and-answer (Q/A) module of the lower assurance system, determining the flight command based on the utterance hypothesis by querying the utterance hypothesis with a second pre-trained neural network model of the set of pre-trained models according to a structured sequence of the natural language queries.

In a second example, wherein the sensor suite comprises a set of time-of-flight sensors and the sensor data comprises time-of-flight data from the set of time-of-flight sensors, S120 can include, with the lower assurance system (e.g., an autonomous computing system): identifying features based on the time-of-flight data using a pre-trained neural network; and autonomously determining a flight command based on the identified features.

However, flight commands can be otherwise suitably determined.

Validating the flight command S130 functions to generate validated flight commands to be used for aircraft control according to S140. Additionally or alternatively, S130 functions to transform autonomously generated commands into (PIC) validated flight commands (e.g., as an implementation of a "human-in-the-loop" control scheme). The format, structure, substance (e.g., values), provenance (e.g., signatures, nonce, etc.), and/or any other suitable aspect of the flight command can be validated. The flight command (and/or aspect thereof) can be validated using one or more validation methods. Examples of validation methods that can be used include: checksum validation (e.g., position-dependent checksum, sum complement validation, fuzzy checksum, etc.), hash-based validation (e.g., comparing a hash determined from the command, such as a hash of the header, a hash of the signature, etc.), data type validation, range and constraint validation, structured validation, format check (e.g., format validation), size check, check digit validation, cardinality check, presence check, and/or any other suitable check or validation method. Validated flight commands can be relayed to the pilot validation interface for pilot review, and/or otherwise managed. Invalid flight commands (e.g., flight commands with a noncompliant format) may be rejected, and the system may throw an error (e.g., which may be provided to the lower assurance system as feedback and/or may be provided to the pilot via an error message/indicator); alternatively, invalid flight commands can be redetermined (e.g., by the lower assurance system), an alternative command source can be used to determine the flight command, and/or invalid flight commands can be otherwise handled. In some variants, the command API of the higher assurance system can be partitioned from the lower assurance system via physical hardware and/or a software partition (e.g., software firewall; ARINC 653 platform; etc.). In such instances, only commands having a valid format may be accepted and/or interpreted by the higher assurance system. However, the format of flight commands can be otherwise validated, or exceptions to a prescribed command format can be otherwise suitably handled.

Validating the flight command S130 can include: optionally validating the flight command at the API; providing a pre-validated flight command to a PIC via the pilot validation interface; receiving pilot feedback via the pilot validation interface; and optionally validating a flight command based on satisfaction of a validation threshold. (PIC) Validated flight commands can then be provided to the FMS (and/or FCS) to facilitate execution of the validated flight command according to S140. Validating the flight command at the API can include: validating the format, structure, and/or substance of the flight command (e.g., prior to providing the flight command at the pilot validation interface).

Figure 8:
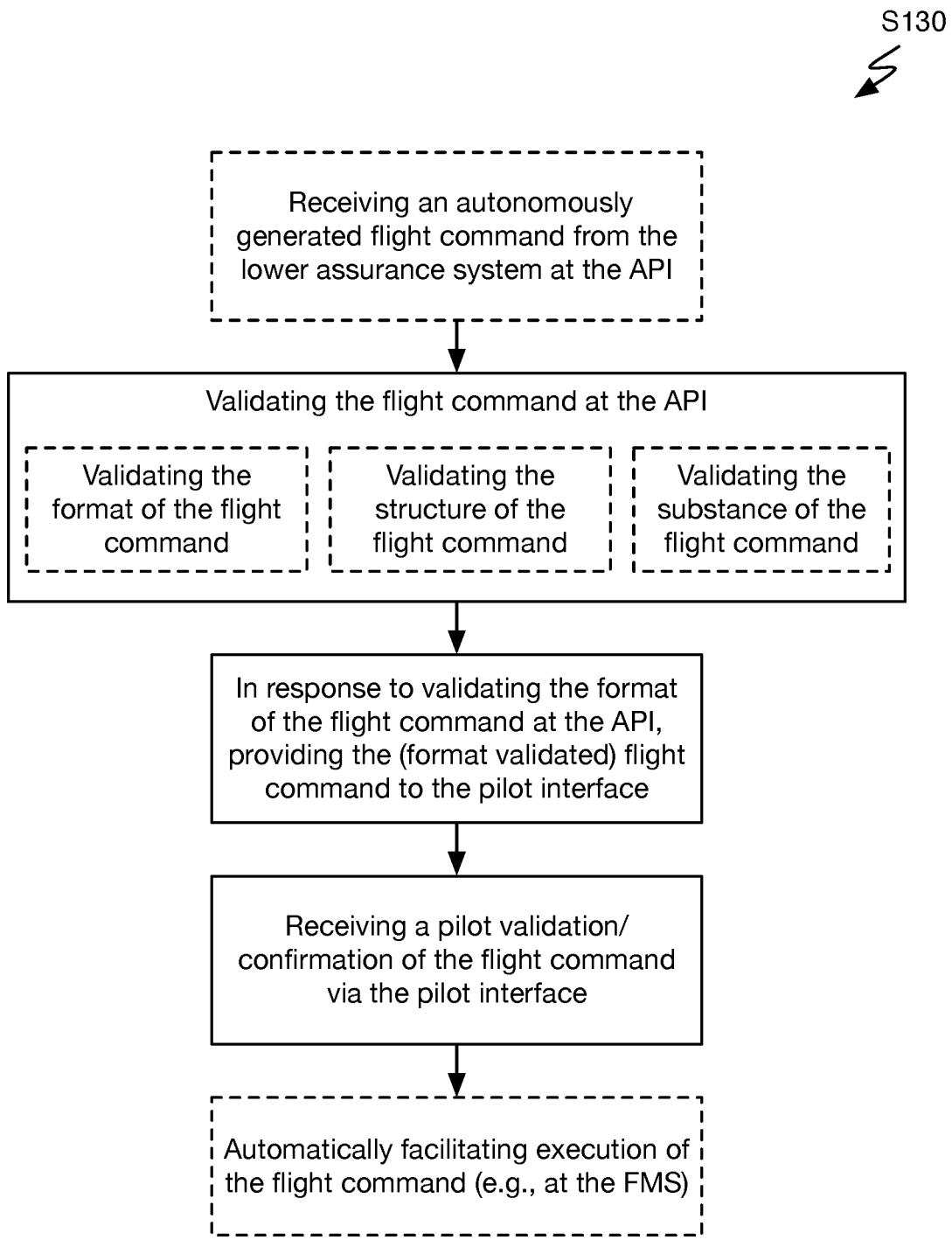
FIG. 8 is a flowchart diagram of an example of flight command validation in a variant of the method.

Validating the flight command (e.g., an example is shown in FIG. 8) can optionally include validating the format (or syntax) of the flight command at the API, which functions to regulate the flow of commands to other parts of the system, and/or functions to ensure that only meaningful (human readable) commands are relayed to a pilot. Preferably, the format and/or syntax is validated by a command API as it is received at the higher assurance system from the lower assurance system, however the format can additionally or alternatively be validated by a format validation module, be validated at the pilot validation interface (e.g., prior to providing it to a pilot) and/or validated using any other suitable system. Validating the format can include: validating a syntax according to a set of predetermined heuristics/ rules, validating that one or more (non-null) command parameter values fall within a predetermined range, validating that a command parameter values fall within a flight envelope (e.g., as determined from a lookup table and/or as may be received as dynamic feedback from the FMS based on the instantaneous flight control), calculating a computational validation of the format (e.g., using a checksum validation, format validation, etc.), validating a signature of the lower assurance system (e.g., wherein the lower assurance system cryptographically signs or encrypts the flight command), and/or any other suitable validations. In an illustrative example, this can include validating that the command is in a platform-standard format or protocol. In another illustrative example, this can include validating that the command references a valid call (e.g., a call, endpoint, or function defined by the API). In variants, validating the structure, calls, and/or parameters of the flight command, as a part of validating the flight command (e.g., at the API; an example is shown in FIG. 7; a second example is shown in FIG. 8), can include: validating the length of the command, validating the parameters specified within the command (e.g., "altitude", "heading", etc.), validating the length of the parameter values specified within the command, and/or validating any other suitable structural attribute of the command. The structure can be validated using any of the methods used to validate the command format, and/or be otherwise validated.

Validating the flight command can additionally or alternatively include validating the substance of the flight command (e.g., in addition to and/or instead of PIC validation). For example, this can include: validating that the parameter values within the command are within a permitted range of values for the parameter, and/or otherwise determined. The substance can be validated using any of the methods used to validate the command format, and/or be otherwise validated.

Validating the flight command can include providing the (flight command to a PIC via the pilot validation interface (e.g., for manual validation), which allows the pilot to interpret it and render a decision (e.g., to accept or reject the flight command; proceed with the flight command or proceed with a modified version of the flight command; etc.). The flight command can be presented to the PIC: after format validation, independent of format validation, before format validation, and/or at any other time. The flight command is preferably both automatically validated and manually validated (e.g., by the PIC), but can alternatively only be automatically validated (e.g., using one or more systems), only manually validated, and/or otherwise validated. The flight command values are preferably presented via the pilot validation interface, but other data can additionally or alternatively be provided. The flight command can be provided by way of a visual display, wireless communication to a ground station (e.g., where the PIC is remote relative to the aircraft), audio signal (e.g., where the command may be read aloud), and/or the flight command can be provided in any other suitable format.

Validating the flight command can include receiving pilot feedback via the pilot validation interface. The pilot preferably validates the substance (e.g., content, values, etc.) of the flight command, but can additionally or alternatively validate the format, validate the response to the flight command, and/or any other suitable information. Pilot feedback can include: a confirmation of a flight command (e.g., a PIC validated flight command), a rejection of a flight command (e.g., a PIC rejected flight command), a modification of a flight command, a replacement flight command, and/or any other suitable pilot feedback. Pilot feedback can be received via the same communication modality as the provision to the PIC (e.g., wireless signal, receipt of an audio response, etc.) or a different communication modality (e.g., receipt of a physical touch/button input, where the flight command provision is auditory or visual). Pilot feedback can be binary (e.g., accept/reject) or non-binary (e.g., enabling modification, adjustment, or clarification of flight commands). Updated or new flight commands can be received through: a verbal input, a textual input, pilot selection of a predetermined set of flight command options (e.g., selection of an icon representing the next-best flight command values determined by the model(s)), and/or otherwise received. However, pilot feedback can be otherwise suitably received via the pilot interface.

Figure 6:
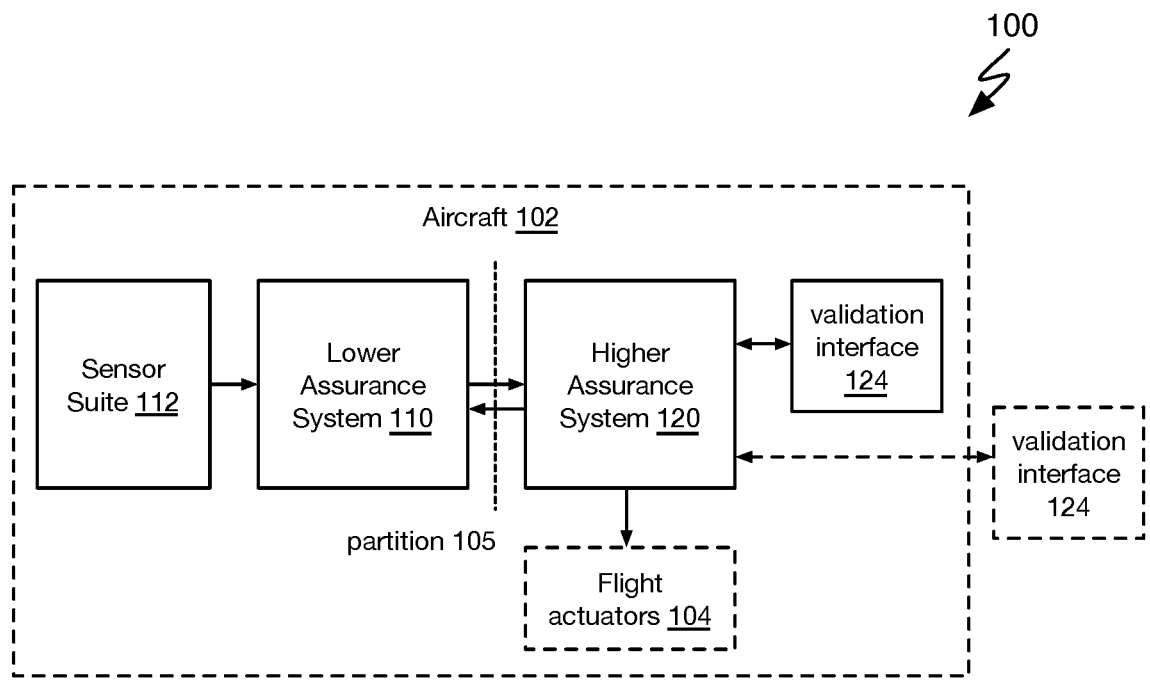
FIG. 6 is an example representation of the system within an aircraft.

In variants, pilot feedback can be received from: only an onboard PIC, only a remote PIC (e.g., where a pilot is incapacitated, where no pilot is present onboard a vehicle, where a pilot is unresponsive, etc.)—such as might be located at a ground station, or both an onboard PIC and a remote PIC (e.g., a multi-factor validation); an example is shown in FIG. 6). However, pilot feedback can be received at any suitable endpoints and/or with any suitable redundancies.

In variants, S130 can include, at the higher assurance system (e.g., a pilot validation interface thereof): determining a PIC validated flight command based on a pilot confirmation (e.g., receipt of confirmation feedback which accepts the flight command) or determining a rejected flight command based on a pilot rejection (e.g., receipt of a rejection and/or replacement flight command). In either case, pilot feedback can be relayed to the lower assurance system (e.g., via the command API) to inform generation of future commands. The pilot feedback can additionally or alternatively be used to retrain the model(s) generating the validated or invalidated commands.

In some alternate instances, a PIC may fail to provide feedback via the pilot validation interface (e.g., such as in the event that a PIC is incapacitated). In such cases validating the flight command can optionally include validating a flight command based on satisfaction of a validation threshold, which may function to automatically confirm a flight command (i.e., determine a validated flight command) without PIC feedback. As an example, a pilot validation interface may automatically confirm/accept a command to execution in S140 after a predetermined duration (e.g., 15 seconds, 30 seconds, 1 minute, 5 minutes, etc.) and/or in response to satisfaction of a validation condition (e.g., timer expiration, dynamic threshold, separate determination that a pilot is incapacitated, full autonomy state, violation of a control envelope boundary, etc.). As a second example, a pilot validation interface may automatically confirm/accept a command if the aircraft has exceeded a control envelope (e.g., for more than a threshold duration). However, the higher assurance system can otherwise implement validation thresholds or otherwise bypass a PIC, or may otherwise be configured to not (e.g., never) override/bypass a PIC.

In variants, S130 can include (e.g., at an API; prior to facilitating pilot validation with the validation interface):

automatically validating adherence to a predetermined, machine-readable data format, automatically validating the flight command with a hash function or a checksum, and/or automatically validating the flight command based on a flight envelope.

In some variants, S130 can optionally include PIC validation of commands at the lower assurance system, which can be used to (partially) validate the command prior to the lower assurance system providing the command to the higher assurance system (e.g., via an API). For example, a PIC can validate the substance and/or command parameters of a command prior to the format and/or value range being validated at the API. In a second example, S130 can facilitate pilot-in-the-loop adjustment, where a pilot can adjust commands and/or provide feedback to the lower assurance system (e.g., at either the lower assurance or higher assurance systems, on either side of the partition 105, etc.), which may be used to adjust, modify, and/or update commands prior to provision to the higher assurance system and/or execution in S140.

Figure 9:
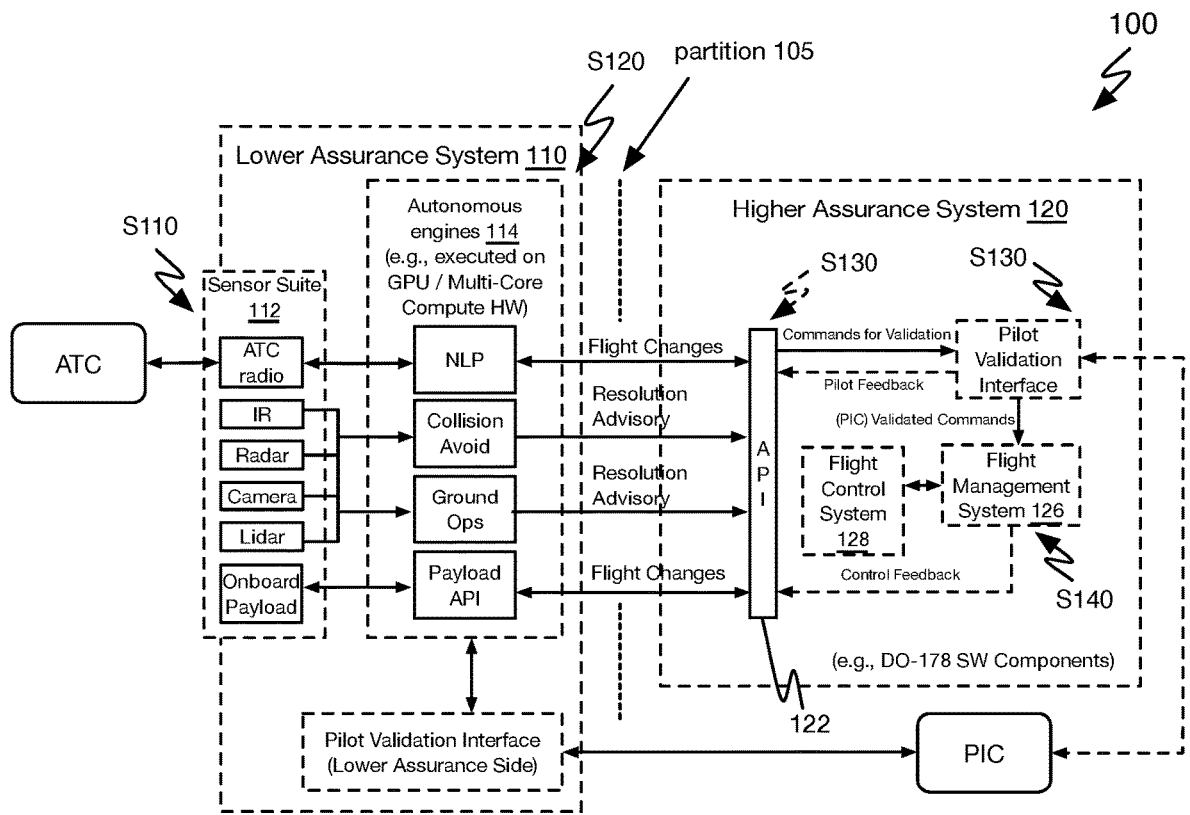
FIG. 9 is a schematic diagram of a variant of the system and/or method.

In one variant (an example is shown in FIG. 9), the lower assurance system can include a (first) pilot validation interface which can facilitate pilot-in-the-loop validation of commands in S130, prior to format validation at the higher assurance system (e.g., at an API thereof; where the lower assurance system can be an autonomous flight-aid; an example is shown in FIG. 9). The higher assurance system may further validate the command at the API and/or a (second) pilot validation interface as a part of S130.

Figure 10:
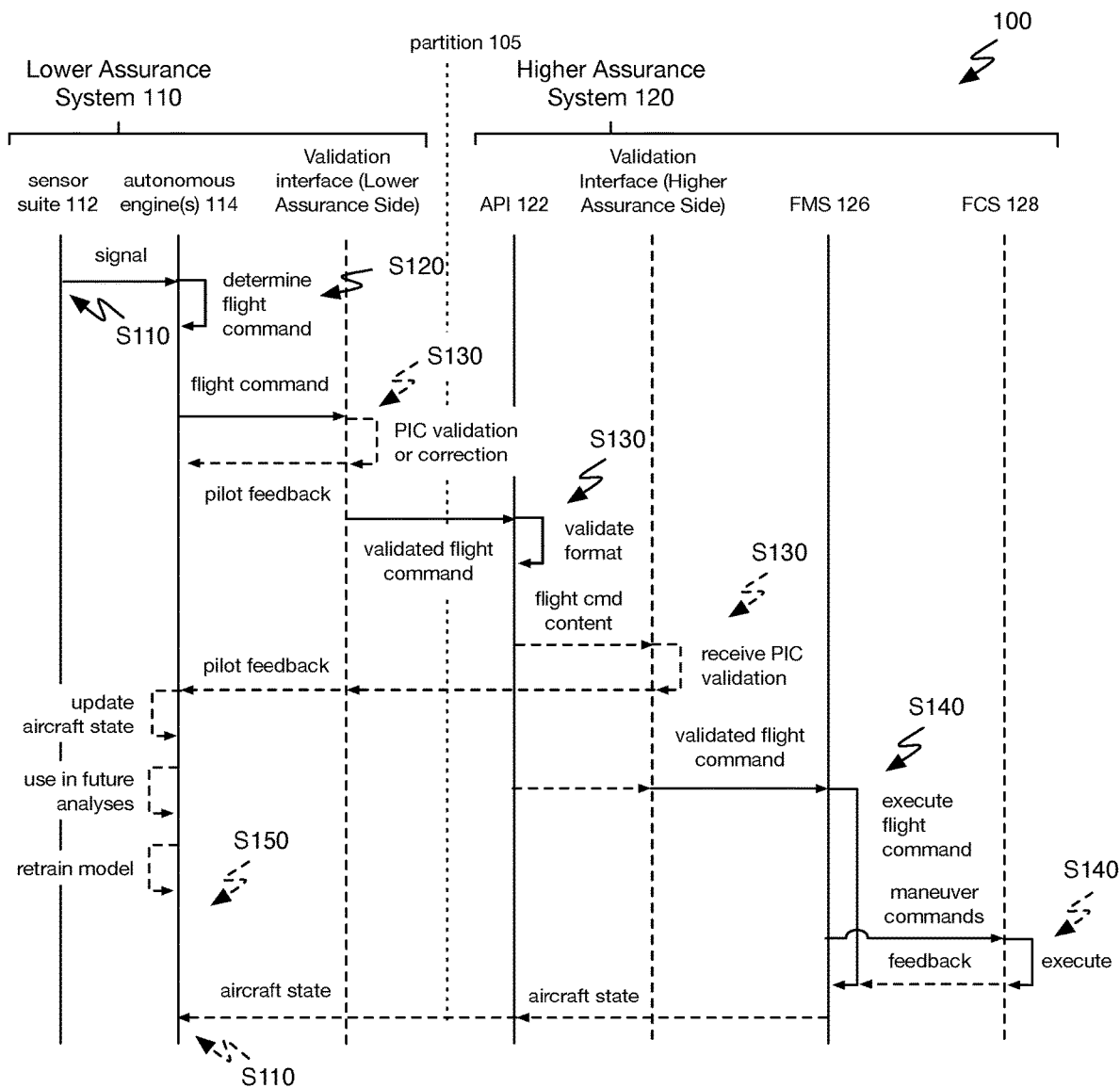
FIG. 10 is a schematic representation of an example of aircraft control using an example of the system.

In one variant (e.g., an example is shown in FIG. 10), the PIC can correct and/or validate commands within the lower assurance system (e.g., in a pilot-in-the-loop configuration, where the system can operate as an autonomous flight aid) as a part of S130 prior to format validation at the API. For instance, the PIC can adjust commands and/or high-level intent associated therewith (e.g., adjust flightpath to increase altitude) while they are being processed within the lower assurance system and can confirm the resulting command parameters/values at the higher assurance system.

In another variant, the user (e.g., the PIC, a copilot, etc.) can validate commands output by the lower assurance system, wherein the user-validated commands can be treated as high-assurance commands. The user validated commands can be passed directly to the flight management system, passed to the higher assurance system, and/or be otherwise used.

However, flight commands can be otherwise suitably validated.

Facilitating execution of a validated flight command S140 functions enable traversal of an aircraft based on the validated flight command. In variants, S140 can include modifying a mission plan including a set of navigation parameters—such as waypoints—which flight systems (e.g., FMS and FCS) can utilize to control the aircraft from a departure site to a landing site (e.g., based on the aircraft state). In variants, S140 can include controlling flight actuators (e.g., via the FMS and/or FCS) to modify a current aircraft state. In variants, S140 can include controlling the aircraft according to a predetermined mission sequence in response to receipt of the flight command (e.g., where the flight command can include an event trigger: such as a PIC validated confirmation to proceed to a subsequent step of the mission sequence).

S140 preferably occurs in response to validation of the flight command by a PIC (in accordance with block S130), however the execution of flight commands can continue: persistently, until the command is overridden by a subsequent flight command, until an event trigger is satisfied (e.g., satisfaction of a predetermined time threshold, satisfaction of a predetermined aircraft location, etc.; as may be specified by a termination condition of a flight command), and/or any other suitable frequency/timing. Additionally or alternatively, flight commands can be executed once (e.g., a single instance course correction), repeatedly, and/or can be otherwise suitably executed.

However, flight commands can be otherwise suitably executed.

Optionally generating a trained model S150 functions to add, refine, update, and/or supplant the set of models within the lower assurance system. S150 can include receiving pilot feedback and/or control feedback at the lower assurance system, which may be stored (e.g., locally or remotely) and used to train/update neural network models or machine learning (ML) models. Models can be dynamically modified during flight missions or unmodified during flight missions, updated by way of wireless "over-air" updates, static (unmodified) after deployment, and/or can be otherwise implemented. Models can be trained locally (on-board the aircraft) or remotely (e.g., via cloud processing or processing at remote data centers). In a specific example, model(s) can be pre-trained (e.g., prior to execution of S120, such as during a prior iteration of S150; pre-generated using remote computing; etc.), and can optionally be trained/updated during one or more iterations of the method.

However, models can be otherwise suitably trained/updated. Alternatively, models can be pre-trained (e.g., using a previously generated training dataset) and may be static and/or unchanged based on execution according to S100.

5. EXAMPLES

In a first variant, at the lower assurance system: a collision avoidance system detects, classifies, and tracks a set of collision threats (e.g., non-transponder aircraft on a collision course) and computes a recommended course of action in the form of a resolution advisory (RA) to allow own aircraft to avoid the collision without cooperation from the intruder. The RA is passed to an Application Protocol Interface (API) of the certified (higher assurance) system controlling the aircraft. The API performs validation (e.g., checksum; hash function; cryptographic hash function, etc.) to validate the format of the RA command (not its content). The API passes the unvalidated RA command (e.g., turn left 30°) to a validation module.

In a first example of the first variant (e.g., for an aircraft with one on-board PIC and no link to a ground station; for an aircraft with no on-board pilot and a link to a ground station), the validation module displays the text of the RA command to the Pilot in Command (PIC). The PIC could be on-board the aircraft or operating remotely from a Ground Station (GS). The GS can be connected by a Line-of-Sight (LOS) radio (RF) link or by a Beyond Line of Sight (BLOS) Satellite link (SATCOM). The PIC accepts or rejects the RA command as a proper course of action. This validation feedback is provided back to the CA system through the API. PIC accepted (validated) RA commands are passed to the Flight Management System (FMS) to facilitate execution of the RA (e.g., by the FCS). The FMS can additionally provide feedback to the CA as to the status (e.g., attitude) of the aircraft.

In a second example of the first variant (e.g., for an aircraft with one pilot on-board and a link to a ground station), the validation module displays the text of the RA command to the on-board Pilot in Command (PIC). If the PIC responds, the (on-board) PIC accepts or rejects the RA command as a proper course of action. This validation feedback is provided back to the CA system through the API. If the PIC does not respond to the validation request (e.g., within a threshold duration), the validation request will be forwarded to a remote Ground Station (GS). The GS could be connected by a Line-of-Sight (LOS) radio (RF) link or by a Beyond Line of Sight (BLOS) Satellite link (SATCOM). If the GS responds to the validation request, it can be handled as a PIC accepting or rejecting the RA command. If neither the PIC nor GS respond to the validation request within a specified time, the system can treat the command as (automatically) validated/accepted. The accepted (validated) RA commands are passed to the Flight Management System (FMS) to facilitate execution of the via the FCS. The FMS can additionally provide feedback to the CA as to the status (e.g., attitude) of the aircraft. In a third example, the method can include: at a lower assurance system: receiving a set of external inputs, generating a set of outputs (e.g., commands, interpretations, etc.) based on the set of external outputs, and passing the set of outputs to a higher assurance system (e.g., in a machine-interpretable form); wherein the higher assurance system validates the set of outputs (e.g., format, substance, etc.; in a machine-interpretable form; etc.), optionally presents the set of outputs to a user (e.g., a pilot; in semantic or human-readable form), optionally receives a user validation of the output, and passes the validated set of outputs to a downstream system (e.g., flight management system, flight control system, etc.; in machine-readable form, etc.). In an illustrative example, the lower assurance system can generate a command value of "1", wherein "1" means "climb"; and pass "1" to the higher assurance system, wherein the higher assurance system validates that "1" is a valid command value. The higher assurance system then determines the semantic equivalent of "1" (e.g., "climb), displays the semantic equivalent of the command to the user, receives a validation of the command, and passes the machine-interpretable value (e.g., "1") to a downstream system.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. An aircraft system comprising:
   an autonomous computing system communicatively coupled to a sensor suite onboard an aircraft, the autonomous computing system comprising a set of pre-trained neural networks, wherein the autonomous computing system is configured to determine a flight command with the set of pre-trained neural networks based on sensor data from the sensor suite;
   an aircraft computing system partitioned from the autonomous computing system and communicatively coupled to the autonomous computing system, the aircraft computing system comprising:
      a pilot validation interface communicatively coupled to a flight management system (FMS), the pilot validation interface configured to:
         facilitate pilot validation of the flight command in a human-interpretable format; and
         in response to pilot validation of the flight command, automatically facilitate execution of the flight command via the flight management system (FMS),
   wherein the autonomous computing system is onboard the aircraft and the aircraft computing system partitioned from the autonomous computing system by a firewall.

2. The aircraft system of claim 1, wherein the sensor data comprises unstructured information, wherein the set of pre-trained neural networks are configured to autonomously determine the flight command in a predetermined, machine-readable format from the unstructured information.

3. The aircraft system of claim 2, further comprising: an application programming interface (API) communicatively coupled to the autonomous computing system and the pilot validation interface, the API configured to:
   receive the flight command from the autonomous computing system;
   automatically validate adherence of the flight command to the predetermined, machine-readable data format; and
   provide the flight command to the pilot validation interface based on the automatic validation of flight command adherence to the predetermined, machine-readable data format.

4. The aircraft system of claim 3, wherein the API is further configured to automatically validate adherence of the flight command to the predetermined, machine-readable data format with a hash function or a checksum.

5. The aircraft system of claim 3, wherein the API is further configured to automatically validate the flight command based on a flight envelope.

6. The aircraft system of claim 1, wherein the human-interpretable format comprises a human-readable format, wherein the pilot validation interface comprises a display, wherein the pilot validation interface is configured to provide the flight command at the display in the human-readable format.

7. The aircraft system of claim 6, wherein pilot validation comprises: automatic acceptance of the flight command based on satisfaction of a validation condition.

8. The aircraft system of claim 7, wherein the validation condition comprises a pilot response time threshold.

9. The aircraft system of claim 1, wherein the autonomous computing system comprises a multi-core processor.

10. The aircraft system of claim 1, wherein the flight command comprises a resolution advisory.

11. The aircraft system of claim 1, wherein the sensor data comprises an air traffic control (ATC) audio signal, wherein the autonomous computing system comprises:
- a speech-to-text module configured to determine an utterance hypothesis from the ATC audio signal with a first pre-trained neural network of the set; and
- a question-and-answer (Q/A) module configured to determine the flight command based on the utterance hypothesis using a plurality of natural language queries, wherein the question-and-answer (Q/A) module is configured to determine aircraft commands by querying the utterance hypothesis with a second pre-trained neural network of the set according to a structured sequence of the natural language queries.

12. The aircraft system of claim 1, wherein the sensor suite comprises a set of time-of-flight sensors and the sensor data comprises time-of-flight data from the set of time-of-flight sensors, wherein the autonomous computing system is configured to:
- identify features based on the time-of-flight data using a pre-trained neural network of the set; and
- autonomously determine the flight command based on the identified features.

13. A method for control of an aircraft, the method comprising:
- determining sensor information with a sensor suite of the aircraft;
- based on the sensor information, determining a flight command with an autonomous computing system onboard the aircraft using a set of pre-trained models of the autonomous computing system;
- receiving the flight command at an application program interface (API) which is partitioned from the autonomous computing system;
- validating the flight command, comprising:
  - in response to receiving the flight command at the API, validating a format compliance of the flight command received at the API;
  - in response to validating the format compliance of the flight command received at the API, providing the flight command in a human-interpretable format at a pilot validation interface; and
  - based on the provision of the flight command in the human-interpretable format at the pilot validation interface, determining a pilot validation of the flight command using the pilot validation interface; and
- in response to determining the pilot validation, automatically facilitating execution of the flight command.

14. The method of claim 13, wherein the sensor information is unstructured, wherein the flight command comprises a predetermined machine-readable data structure, wherein validating format compliance comprises validating adherence to the predetermined machine-readable data structure.

15. The method of claim 13, wherein determining the pilot validation comprises receiving a pilot confirmation at the pilot validation interface.

16. The method of claim 13, wherein automatically facilitating execution of the flight command comprises providing the flight command to a flight management system (FMS) and executing the command via a flight control system (FCS).

17. The method of claim 14, further comprising:
- determining a second flight command with the autonomous computing system of the aircraft using the set of pre-trained models of the autonomous computing system;
- receiving the second flight command at the API;
- providing the second flight command at a pilot validation interface;
- determining a pilot override of the second flight command with the pilot validation interface, the pilot override comprising a third flight command; and
- in response to determining the pilot override, automatically facilitating execution of the third flight command.

18. The method of claim 17, further comprising: updating at least one of the set of pre-trained models of the autonomous computing system based on the pilot override.

19. The method of claim 13, wherein the sensor information comprises an air traffic control (ATC) audio signal, wherein determining the flight command comprises:
- with a speech-to-text module of the autonomous computing system, determining an utterance hypothesis from the ATC audio signal using a first pre-trained neural network model of the set of pre-trained models; and
- with a question-and-answer (Q/A) module of the autonomous computing system, determining the flight command based on the utterance hypothesis by querying the utterance hypothesis with a second pre-trained neural network model of the set of pre-trained models according to a structured sequence of the natural language queries.

* * * * *

UNITED STATES PATENT AND TRADEMARK OFFICE
CERTIFICATE OF CORRECTION

| | | |
|---|---|---|
| PATENT NO. | : 11,914,372 B2 | Page 1 of 1 |
| APPLICATION NO. | : 17/891845 | |
| DATED | : February 27, 2024 | |
| INVENTOR(S) | : Naiman et al. | |

It is certified that error appears in the above-identified patent and that said Letters Patent is hereby corrected as shown below:

On the Title Page

Item (72) Inventor is corrected to read:
-- Alexander Naiman, Boston, MA (US);
Cynthia Comer, Boston, MA (US);
Molly Connolly, Boston, MA (US);
Matthew George, Boston, MA (US);
Joseph Bondaryk, Boston, MA (US) --.

Signed and Sealed this
Thirtieth Day of September, 2025

John A. Squires
*Director of the United States Patent and Trademark Office*